(12) United States Patent
Collins

(10) Patent No.: US 7,672,496 B2
(45) Date of Patent: Mar. 2, 2010

(54) FORMING THREE DIMENSIONAL OBJECTS USING A DECISION RULE IN MEDICAL IMAGE DATA

(75) Inventor: Michael J. Collins, Beavercreek, OH (US)

(73) Assignee: iCAD, Inc., Beavercreek, OH (US)

( * ) Notice: Subject to any disclaimer, the term of this patent is extended or adjusted under 35 U.S.C. 154(b) by 885 days.

(21) Appl. No.: 11/472,175

(22) Filed: Jun. 21, 2006

(65) Prior Publication Data

US 2007/0297659 A1    Dec. 27, 2007

(51) Int. Cl.
*G06K 9/00* (2006.01)

(52) U.S. Cl. .................. 382/128; 382/131; 382/154

(58) Field of Classification Search .......... 382/128, 382/13, 154
See application file for complete search history.

(56) References Cited

U.S. PATENT DOCUMENTS

| | | | |
|---|---|---|---|
| 4,899,109 A | 2/1990 | Tropp et al. | |
| 5,068,808 A | 11/1991 | Wake | |
| 5,159,663 A | 10/1992 | Wake | |
| 5,201,035 A | 4/1993 | Stytz et al. | |
| 5,706,813 A | 1/1998 | Filler et al. | |
| 6,112,109 A | 8/2000 | D'Urso | |
| 6,175,655 B1 | 1/2001 | George, III et al. | |
| 6,249,594 B1 | 6/2001 | Hibbard | |
| 6,280,387 B1 | 8/2001 | Deforge et al. | |
| 6,351,513 B1 | 2/2002 | Bani-Hashemi et al. | |
| 6,363,163 B1 * | 3/2002 | Xu et al. ............... 382/130 |
| 6,370,421 B1 | 4/2002 | Williams et al. | |
| 6,389,104 B1 | 5/2002 | Bani-Hashemi et al. | |
| 6,415,048 B1 | 7/2002 | Schneider | |
| 6,421,454 B1 | 7/2002 | Burke et al. | |
| 6,430,430 B1 | 8/2002 | Gosche | |
| 6,466,687 B1 * | 10/2002 | Uppaluri et al. ....... 382/128 |
| 6,487,432 B2 | 11/2002 | Slack | |
| 6,556,695 B1 | 4/2003 | Packer et al. | |
| 6,674,880 B1 | 1/2004 | Stork et al. | |
| 6,806,706 B2 | 10/2004 | Gurr | |
| 6,898,263 B2 | 5/2005 | Avinash et al. | |
| 6,898,303 B2 * | 5/2005 | Armato et al. ......... 382/131 |
| 6,901,277 B2 | 5/2005 | Kaufman et al. | |
| 6,905,468 B2 | 6/2005 | McMorrow et al. | |
| 6,982,710 B2 | 1/2006 | Salomie | |
| 7,020,316 B2 | 3/2006 | Wei et al. | |
| 7,058,210 B2 | 6/2006 | Mundy et al. | |

* cited by examiner

*Primary Examiner*—Tom Y Lu
(74) *Attorney, Agent, or Firm*—Foley Hoag LLP

(57) ABSTRACT

A decision rule is used that examines the computer-aided detected (CAD) regions of interest in a computed tomography (CT) slice pair taken from volumetric medical CT scan to determine whether the detected regions of interest are part of the same object is disclosed. Segmentation is performed after initially detecting a region of interest but before calculating features in order to refine the boundaries of the detected regions of interest. Segmentation occurs in the two-dimensional slices by segmenting the region of interest on each slice. Adjacent slices are examined to determine if adjacent objects are actually part of the same structure. If they are not, the objects are split apart. In this way, three-dimensional objects are formed from two-dimensional segmentations.

38 Claims, 2 Drawing Sheets

FORMING THREE DIMENSIONAL OBJECTS USING A DECISION RULE IN MEDICAL IMAGE DATA

BACKGROUND OF THE INVENTION

The present invention generally relates to forming well-segmented objects in three dimensional medical imagery and, in particular, relates to forming well-segmented objects in three dimensional medical imagery using a decision rule or classifier.

Computed Tomography (CT) systems produce volumetric images, providing three-dimensional information of structures internal to the body. This imagery is commonly viewed on film as a collection of many tens of two-dimensional images, also referred to as slices. Each slice is reviewed by the radiologist in the search for abnormalities. Although multiple slices provide more opportunities for a lesion to be detected, the possibility of missing a lesion is also increased due to the increased workload by generating a greater number of individual images per scan. A thoracic CT scan formerly produced approximately thirty sections with the 10-mm collimation that was standard for many years. State-of-the-art multidetector scanners now have collimation as thin as less than 1 mm, and commonly generate more than fifteen times as many section images for radiologists to interpret. With an increase in the number of CT scans being performed for a wide variety of diagnostic and screening purposes compounded by an increasing number of images acquired during each scan, computerized techniques for the automated analysis of CT scans for disease (and especially for lung nodules that may represent lung cancer and colon polyps that may represent colorectal cancer) are quickly becoming a necessity. Additionally, computer-aided detection (CAD) systems are now commercially available and are being developed to assist in challenges of detecting suspicious lesions such as, for example, lung nodules and colon polyps in thoracic imagery.

In initial processing steps, CAD systems typically detect many candidate suspicious areas. In subsequent processing, the initial detections are analyzed to determine whether or not to display a detected region to a user in the final stage. Accurate shape estimates of the initial detections are essential to make good decisions regarding whether or not detections are ultimately displayed.

CAD systems are used to assist radiologists in the detection of suspicious lesions. It is essential for CAD systems to have a reliable estimation of the shape of a lesion in order to make accurate decisions regarding whether or not an initial CAD system detection is ultimately displayed to a user. Therefore, there is a need for a method for accurate shape estimation of nodules or polyps.

Additionally, an object detector locates nearly all the areas of interest within the lungs or colon such as, for example, nodules and polyps. However, the detector Regions of Interest (ROIs) are intended to provide the core of the region of interest, and often underestimate the complete extent of objects that are identified. Some classes of features (e.g., intensity-based features, shape features, etc.) show improved separability with a better estimate of the extent of the ROIs. Therefore, it is beneficial to provide a refined segmentation to the features and classification algorithms in addition to the detection mask.

A common problem during the segmentation is for the region of interest (nodule, polyp, etc.) to be incorrectly attached to an anatomic structure during the step where slices are combined. The incorrect segmentations can lead to poor features, and as a result, can cause otherwise suspicious regions to be rejected during the classification stage.

Often, objects are formed with a simple connectiveness rule. With this rule, voxels are considered part of the same object if the voxels touch. Voxels are the smallest distinguishable box-shaped parts of three-dimensional images. However, when forming an object in three dimensions, simple connectiveness is not sufficient for adjacent slices to be considered part of the same object.

Particularly in the Z dimension in the XYZ coordinate system of non-isotropic CT data, adjacent voxels may actually be several times farther apart than those in the other dimensions. For example, the distance between voxels can be 5 mm or more and the voxels though adjacent can actually represent different structures. Therefore, particularly in these situations, using simple connectiveness is not sufficient since it may incorrectly join voxels that are not part of the same structure.

Additionally, sometimes a mathematical morphological opening is used to break any connections the region of interest has to an anatomic structure. However, this operation is insufficient if the region of interest and the anatomic structure have a high degree of overlap. In addition, previous approaches would often leave the region of interest connected to large anatomic structures. For example, in CT Lung CAD, the nodules would be attached to vessels and bronchial structures and in the CT Colon CAD, the polyps would be attached to folds. Therefore, simply using a mathematical morphological opening is also not enough.

Therefore, there is a need for a decision rule or classifier that examines the CAD detected regions of interest in each CT slice pair to determine whether the detected regions of interest are part of the same object or not. In this way, the detected regions of interest can be correctly separated from the anatomic structures.

BRIEF SUMMARY OF THE INVENTION

According to the present invention, a decision rule or classifier is used that examines the CAD segmented regions of interest in each CT slice pair to determine whether the segmented regions of interest are part of the same object or not. Segmentation is performed after initially detecting a region of interest but before calculating features in order to refine the boundaries of the detected regions of interest. Segmentation occurs in the two-dimensional slices by segmenting the region of interest on each slice. Adjacent slices are examined to determine if adjacent objects are part of the same structure. If so, the objects are combined to form three-dimensional objects. If not, the objects are kept separate.

In accordance with one embodiment of the present invention, a decision rule is used to determine whether adjacent objects in the region of interest of a CT slice pair are part of the same object, or structure.

Accordingly, it is a feature of the embodiments of the present invention to examine regions of interest in each CT slice pair and determine whether the regions of interest are part of the same object in order to form a three-dimensional object. Other features of the embodiments of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the invention may be practiced. It is to be understood that other embodiments may be utilized and that logical, mechanical and electrical changes may be made without departing from the spirit and scope of the present invention.

With CT Lung CAD and CT Colon CAD, segmentation occurs after initial regions of interest are detected, but before features are calculated. The detector finds the regions of interest. After detection, segmentation occurs by taking those regions of interest and refining their boundaries. The segmentation first operates in two dimensions by segmenting the region of interest on each CT slice. As a second step, objects detected on adjacent CT slices are combined to form three-dimensional objects. Accurate segmentations allow for accurate features leading to good classification of suspicious features.

Figure 1:
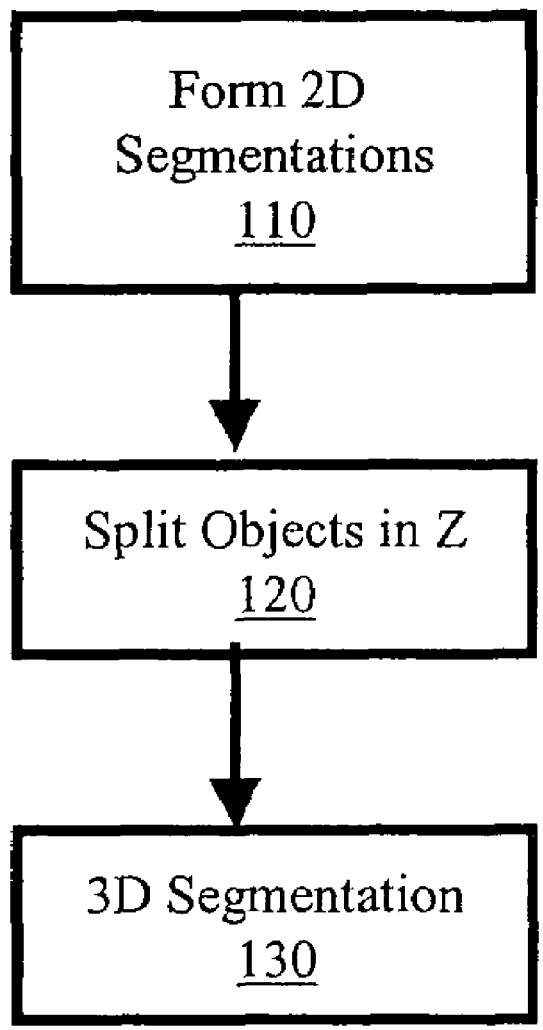
FIG. 1 is a flow chart illustrating segmentation according to an embodiment of the present invention.

Referring initially to FIG. 1 which is a general overview of the steps taken during segmentation of a CT slice pair, the first step 110 is to have or create two-dimension segmentations of each CT slice. Segmentation occurs as described above and as is commonly known in the art. The next step 120 determines whether the two-dimensional segmentations on adjacent CT slices should be grouped together as a one single object to form three-dimensional segmentations (step 130) or that the two-dimensional segmentations actually belong to different objects and should be split apart as described below.

Figure 2:
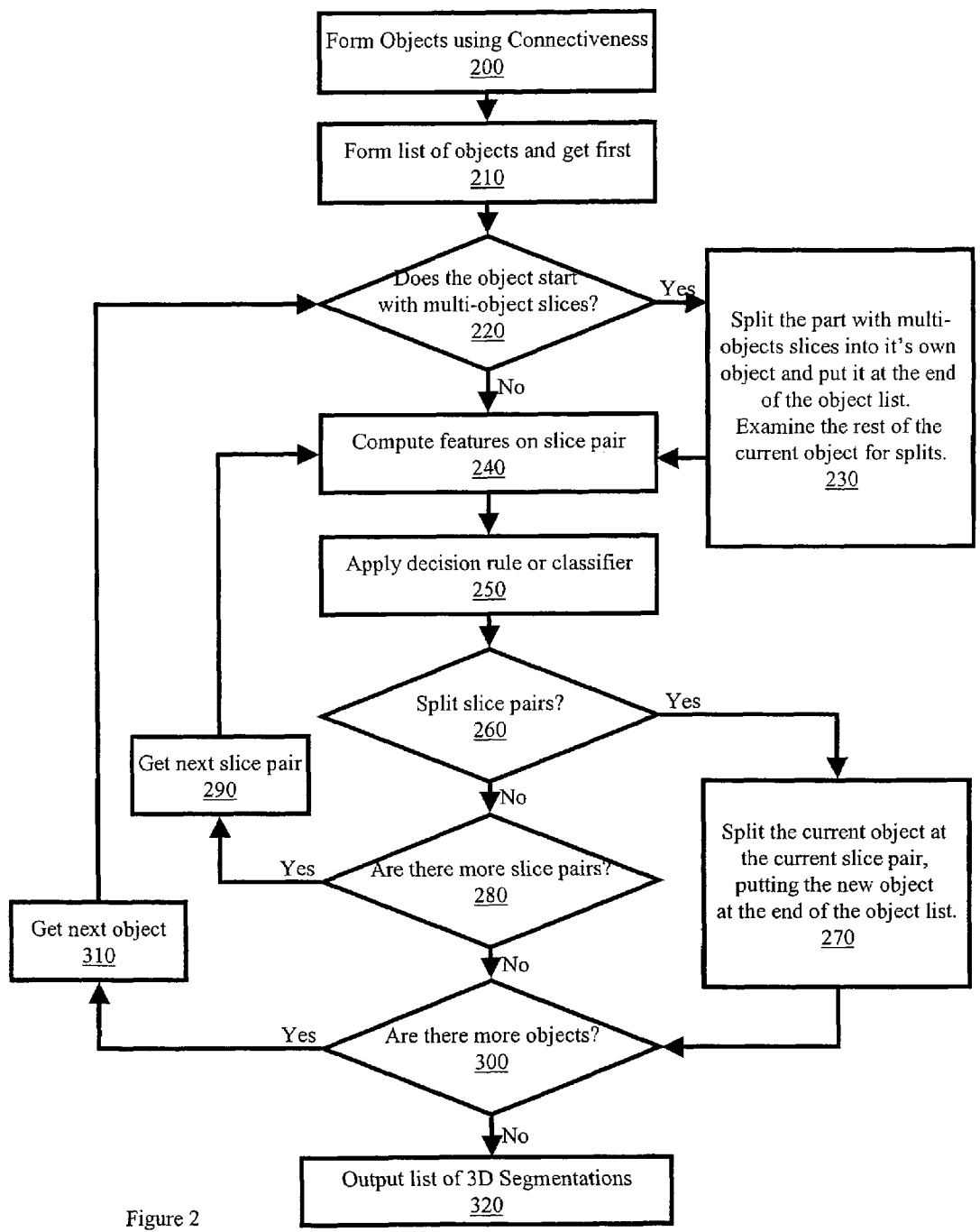
FIG. 2 is a flow chart for splitting objects that do not belong to the same object according to an embodiment of the present invention.

FIG. 2 is a flow chart detailing the steps for determining which two-dimensional segmentation should be grouped together to form three-dimensional segmentations. For purposes of this embodiment, in step 200, all objects are formed by two-dimensional segmentations with simple connectiveness in three-dimensions and the objects are all considered part of the same object. Incorrectly joined slices will be subsequently identified in later steps and split.

All of the formed objects are placed into a list in step 210. Then, all of the CT slices in the objects in the list will be examined successively for potential splitting, starting with the first CT slice in the first object in the list. As the objects are split, the newly formed split-off objects will be added to the end of the list.

Splitting automatically occurs when an object has a slice with a single two-dimensional object that overlaps multiple objects on an adjacent CT slice. With this in mind, each object is examined in step 220 to determine if the object starts with a CT slice containing a single object or CT slice containing multiple objects. If the object starts with one or more CT slices with multiple two-dimensional objects on the CT slice, those CT slices are split from the original object and moved to the end of the object list in step 230. Processing of the object resumes in step 240.

In step 240, features and measurements are calculated using the two-dimensional segmentations on adjacent CT slices containing a single object. In this embodiment, only one feature is used. That feature is the measure of the mutual overlap of the two-dimensional segmentations on the adjacent CT slices. These computed features are used by a decision rule of classifier in step 250 to make a determination as to whether each pair of CT slices constitutes parts of the same object. If the two-dimensional segmentations on adjacent CT slices are determined to be parts of different objects, those two-dimensional segmentations are split apart and placed at the end of the object list.

The splitting determination occurs in step 260. For this embodiment, the decision rule may have a simple threshold of about 0.4 on the mutual overlap feature. If the mutual overlap of the two-dimensional segmentations is greater than 0.4, the objects on the adjacent slices are assumed to be from the same object. Again, slices that contain multiple two-dimensional objects are automatically split. When the objects are split in step 270, the split-off object is placed at the end of the object list and the next object is retrieved from the list in step 300.

When the split occurs, or after all of the CT slices of the current object have been examined (steps 280 and 290 loop over all of the CT slices), the analysis moves to the next object in the list (steps 300 and 310). When all objects have been examined, the splitting process is complete. The output, step 320, is a list or labeled mask of three-dimensional segmentations. Therefore, some objects that would have been previously joined incorrectly using simple connectiveness will no longer be considered the same object.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of forming three dimensional objects in medical imagery, the method comprising:
    a. detecting two-dimensional regions of interest on a plurality of adjacent two-dimensional medical image slices using a CAD system;
    b. for a plurality of detected two-dimensional regions of interest, segmenting the region of interest from each slice;
    c. for a plurality of segmented detected two-dimensional regions of interest located on adjacent slices, determining that the segmented regions of interest are part of a same three-dimensional object by comparing the segmented regions of interest; and
    d. forming three-dimensional objects from the segmented detected two-dimensional regions of interest located on adjacent slices based on the determination.

2. The method of claim 1, wherein the two-dimensional medical image slices are taken of anatomical lungs.

3. The method of claim 1, wherein the two-dimensional medical image slices are taken of an anatomical colon.

4. A method of forming three dimensional objects in medical imagery, the method comprising:

a. detecting regions of interest in two-dimensional CT slices using a CAD system;
b. segmenting the regions of interest from each CT slice;
c. examining the segmented regions of interest on adjacent CT slices to determine whether the segmented regions of interest are part of a same object;
d. combining regions of interest on adjacent CT slices to form three-dimensional objects; and
e. examining the segmented regions of interest to determine if any adjacent CT slices are incorrectly joined.

5. The method of claim 4, further comprising:
splitting apart incorrectly joined objects on adjacent CT slices.

6. The method of claim 4, further comprising:
splitting apart incorrectly joined objects on adjacent CT slices along the Z-direction.

7. The method of claim 4, further comprising:
splitting apart incorrectly joined objects on adjacent CT slices using a decision rule.

8. A method of forming segmented three dimensional objects in CT medical imagery, the method comprising:
a. creating a two-dimensional segmentation of each CT slice of the CT medical imagery;
b. determining whether the two-dimensional segmentations on adjacent CT slices are from the same object;
c. grouping two-dimensional segmentations on adjacent CT slices from the same object to form three-dimensional segmented objects; and
d. splitting apart adjacent CT slices if the two-dimensional segmentations on adjacent CT slices are not from the same object.

9. The method of claim 8, further comprising:
automatically splitting CT slices if a single two-dimensional segmentation on one CT slice has multiple overlapping objects on the adjacent CT slice.

10. The method of claim 8, further comprising:
measuring mutual overlap of the two-dimensional segmentation of adjacent CT slices.

11. A method of forming segmented three dimensional objects in CT medical imagery, the method comprising:
a. creating a two-dimensional segmentation of each CT slice of the CT medical imagery;
b. determining whether the two-dimensional segmentations on adjacent CT slices are from the same object; and
c. grouping two-dimensional segmentations on adjacent CT slices from the same object to form three-dimensional segmented objects;
wherein the step of determining utilizes a decision rule to decide whether the two-dimensional segmentations on adjacent CT slices are from the same object; and
wherein the decision rule is a threshold value of the mutual overlap of the two-dimensional segmentation of adjacent CT slices.

12. The method of claim 11, wherein the two-dimensional segmentations on adjacent CT slices are from the same object if the mutual overlap is greater than the threshold value of the decision rule.

13. The method of claim 12, wherein the threshold value for mutual overlap is about 0.4.

14. A method of outputting a labeled mask of three-dimensional segmentations, the method comprising:
a. forming objects from two-dimensional CT slices;
b. placing all formed objects into a list;
c. examining each two-dimensional CT slice in an formed object to determine if the formed object staffs with a two-dimensional CT slice containing a single object or a two-dimensional CT slice containing multiple objects;
d. automatically splitting the multiple object CT slices from the formed object and moving the multiple object CT slices to the end of the list;
e. measuring the mutual overlap of adjacent two-dimensional CT slices to determine if the adjacent CT slices contain the same object;
f. splitting the adjacent two-dimensional CT slices from the object and moving the two-dimensional CT slices to the end of the list if the mutual overlap is less than a threshold value; and
g. outputting a list of three-dimensional segmentations after all two-dimensional CT slices of all the formed objects in the list have been examined.

15. The method of claim 14, further comprising: detecting regions of interest in the two-dimensional CT slices using a CAD system.

16. The method of claim 14, further comprising: applying a decision rule to determine whether each pair of CT slices constitute parts of the same object.

17. The method of claim 14, wherein the step of splitting the adjacent two-dimensional CT slices is along the Z-direction.

18. The method of claim 14, wherein the step of forming the objects uses simple connectiveness.

19. The method of claim 14, wherein the threshold value for mutual overlap is about 0.4.

20. The method of claim 1, wherein determining that the segmented regions of interest are part of the same three-dimensional object comprises:
c1. forming candidate three-dimensional objects from the segmented regions of interest based on three-dimensional connectiveness; and
c2. for each candidate three-dimensional object, determining whether the three-dimensional object is incorrectly formed.

21. The method of claim 20 wherein determining whether the three-dimensional object is incorrectly formed comprises determining whether a segmented region of interest on one slice overlaps a plurality of segmented regions of interest on at least one adjacent slice.

22. The method of claim 20 wherein determining whether the three-dimensional object is incorrectly formed comprises utilizing at least one feature of the segmented regions of interest on adjacent slices.

23. The method of claim 22 wherein a feature is a mutual overlap of segmented regions of interest on adjacent slices.

24. The method of claim 20 further comprising splitting apart incorrectly formed three-dimensional objects.

25. The method of claim 1, further comprising outputting at least one of a list and a labeled mask of formed three-dimensional objects.

26. The method of claim 1 wherein the two-dimensional medical image slices are computed tomography (CT) slices.

27. The method of claim 5 wherein determining whether segmented regions of interest are part of a same object comprises determining a three-dimensional connectiveness of the regions of interest.

28. The method of claim 27 wherein examining the segmented regions of interest to determine if any adjacent CT slices are incorrectly joined comprises determining whether a two-dimensional region of interest on one slice overlaps a plurality of two-dimensional regions of interest on at least one adjacent slice.

29. The method of claim 27 wherein examining the segmented regions of interest to determine if any adjacent CT slices are incorrectly joined comprises determining feature information of two-dimensional regions of interest.

30. The method of claim 29 wherein the feature information of two-dimensional regions of interest is a measurement of an amount of overlap of two-dimensional regions of interest on adjacent slices.

31. The method of claim 5, further comprising outputting at least one of a list and a labeled mask of the formed three-dimensional objects.

32. A computer-aided detection (CAD) system for forming and outputting three dimensional objects in medical imagery, comprising:
   a. a detector for acquiring two-dimensional regions of interest on a plurality of adjacent two-dimensional medical image slices;
   b. means for comparing acquired two-dimensional regions of interest on adjacent two-dimensional medical image slices to determine whether the two-dimensional regions of interest are part of a same three-dimensional object;
   c. means for forming three-dimensional objects from the two-dimensional regions of interest based on at least the comparison; and
   d. means for outputting at least one of a list and a labeled mask of at least one three-dimensional object.

33. The system of claim 32, wherein the two-dimensional medical image slices are CT slices.

34. The system of claim 32, wherein the means for comparing comprises means for determining whether the two-dimensional regions of interest are part of a same three-dimensional object based on three-dimensional connectiveness.

35. The system of claim 32, wherein the means for forming comprises means for splitting apart incorrectly joined objects on adjacent CT slices.

36. The system of claim 35, wherein the means for forming comprises means for examining two-dimensional regions of interest to determine whether they are incorrectly joined by determining whether a two-dimensional region of interest on one slice overlaps a plurality of two-dimensional regions of interest on at least one adjacent slice.

37. The method of claim 35, wherein the means for forming comprises means for examining two-dimensional regions of interest to determine whether they are incorrectly joined by determining feature information of two-dimensional regions of interest.

38. The method of claim 37, wherein the feature information of two-dimensional regions of interest is a measurement of an amount of overlap of two-dimensional regions of interest on adjacent slices.

* * * * *

UNITED STATES PATENT AND TRADEMARK OFFICE
CERTIFICATE OF CORRECTION

PATENT NO. : 7,672,496 B2  Page 1 of 1
APPLICATION NO. : 11/472175
DATED : March 2, 2010
INVENTOR(S) : Michael J. Collins It is certified that error appears in the above-identified patent and that said Letters Patent is hereby corrected as shown below:

Col. 8, line 15 (Claim 37), replace "method" with --system--

Col. 8, line 20 (Claim 38), replace "method" with --system--

Signed and Sealed this

Fifteenth Day of June, 2010

David J. Kappos
*Director of the United States Patent and Trademark Office*